United States Patent
Cho et al.

(10) Patent No.: US 9,076,205 B2
(45) Date of Patent: Jul. 7, 2015

(54) EDGE DIRECTION AND CURVE BASED IMAGE DE-BLURRING

(71) Applicant: Adobe Systems Incorporated, San Jose, CA (US)

(72) Inventors: Sunghyun Cho, Seattle, WA (US); Jue Wang, Seattle, WA (US); Lin Zhong, Somerset, NJ (US)

(73) Assignee: Adobe Systems Incorporated, San Jose, CA (US)

(*) Notice: Subject to any disclaimer, the term of this patent is extended or adjusted under 35 U.S.C. 154(b) by 84 days.

(21) Appl. No.: 13/680,952

(22) Filed: Nov. 19, 2012

(65) Prior Publication Data

US 2014/0140626 A1    May 22, 2014

(51) Int. Cl.
| | | |
|---|---|---|
| G06K 9/48 | (2006.01) | |
| G06T 5/00 | (2006.01) | |
| G06T 7/00 | (2006.01) | |

(52) U.S. Cl.
CPC ............... *G06T 5/003* (2013.01); *G06T 7/0085* (2013.01)

(58) Field of Classification Search
CPC .............................. G06T 5/003; G06T 7/0085
USPC ............... 348/208.4, 241, 251, 254; 382/199, 382/203, 274, 279
See application file for complete search history.

(56) References Cited

U.S. PATENT DOCUMENTS

| | | | |
|---|---|---|---|
| 5,151,998 A | 9/1992 | Capps | |
| 5,652,828 A | 7/1997 | Silverman | |
| 5,671,283 A | 9/1997 | Michener et al. | |
| 5,689,587 A | 11/1997 | Bender et al. | |
| 5,870,499 A | 2/1999 | Bender et al. | |
| 6,122,375 A | 9/2000 | Takaragi et al. | |
| 6,208,348 B1 | 3/2001 | Kaye | |
| 6,266,412 B1 | 7/2001 | Berenzweig et al. | |
| 6,316,712 B1 | 11/2001 | Laroche | |
| 6,333,983 B1 | 12/2001 | Enichen | |
| 6,370,247 B1 | 4/2002 | Takaragi et al. | |
| 6,480,957 B1 | 11/2002 | Liao et al. | |
| 6,778,667 B1 | 8/2004 | Bakhle et al. | |
| 6,792,113 B1 | 9/2004 | Ansell et al. | |
| 6,804,355 B1 | 10/2004 | Graunke | |
| 7,003,107 B2 | 2/2006 | Ananth | |
| 7,103,181 B2 | 9/2006 | Ananth | |
| 7,130,467 B1 | 10/2006 | Bronder et al. | |

(Continued)

FOREIGN PATENT DOCUMENTS

WO    WO-2010086317    8/2010

OTHER PUBLICATIONS

"Non-Final Office Action", U.S. Appl. No. 13/309,982, (Jan. 17, 2013), 32 pages.

(Continued)

*Primary Examiner* — Gregory M Desire
(74) *Attorney, Agent, or Firm* — Wolfe-SBMC

(57) ABSTRACT

An image de-blurring system obtains a blurred input image and generates, based on the blurred input image, a blur kernel. The blur kernel is an indication of how the image capture device was moved and/or how the subject captured in the image moved during image capture. Based on the blur kernel and the blurred input image, a de-blurred image is generated. The blur kernel is generated based on the direction of edges identified in the blurred input image and/or based on curves having a high curvature identified in the image (e.g., corners identified in the image).

20 Claims, 10 Drawing Sheets

(56) References Cited

U.S. PATENT DOCUMENTS

| | | | |
|---|---|---|---|
| 7,142,669 B2 | 11/2006 | Dworkin et al. |
| 7,200,226 B2 | 4/2007 | Bace |
| 7,213,156 B2 | 5/2007 | Fukuda |
| 7,218,733 B2 | 5/2007 | Li et al. |
| 7,221,756 B2 | 5/2007 | Patel et al. |
| 7,269,664 B2 | 9/2007 | Hutsch et al. |
| 7,269,854 B2 | 9/2007 | Simmons et al. |
| 7,350,070 B2 | 3/2008 | Smathers et al. |
| 7,400,744 B2 | 7/2008 | Nichani et al. |
| 7,412,060 B2 | 8/2008 | Fukuda |
| 7,418,100 B2 | 8/2008 | McGrew et al. |
| 7,536,016 B2 | 5/2009 | Benaloh |
| 7,603,563 B2 | 10/2009 | Ansell et al. |
| 7,636,691 B2 | 12/2009 | Maari |
| 7,680,269 B2 | 3/2010 | Nicolai et al. |
| 7,693,278 B2 | 4/2010 | Hiramatsu |
| 7,715,591 B2 | 5/2010 | Owechko et al. |
| 7,757,299 B2 | 7/2010 | Robert et al. |
| 7,827,408 B1 | 11/2010 | Gehringer |
| 7,836,311 B2 | 11/2010 | Kuriya et al. |
| 7,861,312 B2 | 12/2010 | Lee et al. |
| 7,884,854 B2 * | 2/2011 | Banner et al. ............ 348/208.99 |
| 7,924,323 B2 | 4/2011 | Walker et al. |
| 8,051,287 B2 | 11/2011 | Shetty et al. |
| 8,082,592 B2 | 12/2011 | Harris |
| 8,095,795 B2 | 1/2012 | Levy |
| 8,099,519 B2 | 1/2012 | Ueda |
| 8,103,505 B1 | 1/2012 | Silverman et al. |
| 8,130,952 B2 | 3/2012 | Shamoon et al. |
| 8,184,182 B2 * | 5/2012 | Lee et al. ...................... 348/241 |
| 8,189,769 B2 | 5/2012 | Ramasamy et al. |
| 8,199,216 B2 | 6/2012 | Hwang |
| 8,245,033 B1 | 8/2012 | Shetty et al. |
| 8,291,219 B2 | 10/2012 | Eto |
| 8,300,812 B2 | 10/2012 | Van De Ven |
| 8,315,396 B2 | 11/2012 | Schreiner et al. |
| 8,345,976 B2 | 1/2013 | Wang et al. |
| 8,390,704 B2 * | 3/2013 | Wang et al. ................... 348/248 |
| 8,417,806 B2 | 4/2013 | Chawla et al. |
| 8,428,390 B2 * | 4/2013 | Li et al. .......................... 382/274 |
| 8,520,083 B2 * | 8/2013 | Webster et al. ............ 348/208.4 |
| 8,543,386 B2 | 9/2013 | Oh et al. |
| 8,548,226 B2 | 10/2013 | Sakano et al. |
| 8,571,305 B2 | 10/2013 | Kao |
| 8,571,308 B2 | 10/2013 | Grafulla-González |
| 8,583,443 B2 | 11/2013 | Misawa |
| 8,586,847 B2 | 11/2013 | Ellis et al. |
| 8,594,385 B2 | 11/2013 | Marchesotti et al. |
| 8,615,108 B1 | 12/2013 | Stoppa et al. |
| 8,619,082 B1 | 12/2013 | Ciurea et al. |
| 8,694,319 B2 | 4/2014 | Bodin et al. |
| 8,731,913 B2 | 5/2014 | Zopf et al. |
| 8,738,633 B1 | 5/2014 | Sharifi et al. |
| 8,805,560 B1 | 8/2014 | Tzanetakis et al. |
| 8,879,731 B2 | 11/2014 | Schultz |
| 8,886,543 B1 | 11/2014 | Sharifi et al. |
| 8,897,588 B2 | 11/2014 | Wang et al. |
| 8,903,088 B2 | 12/2014 | Schultz |
| 8,914,290 B2 | 12/2014 | Hendrickson et al. |
| 8,953,811 B1 | 2/2015 | Sharifi et al. |
| 2002/0154779 A1 | 10/2002 | Asano et al. |
| 2004/0030656 A1 | 2/2004 | Kambayashi et al. |
| 2005/0015343 A1 | 1/2005 | Nagai et al. |
| 2005/0201591 A1 | 9/2005 | Kiselewich |
| 2005/0232463 A1 | 10/2005 | Hirvonen et al. |
| 2006/0045211 A1 | 3/2006 | Oh et al. |
| 2006/0078194 A1 | 4/2006 | Fradkin et al. |
| 2006/0122839 A1 | 6/2006 | Li-Chun Wang et al. |
| 2006/0165240 A1 | 7/2006 | Bloom et al. |
| 2006/0173846 A1 | 8/2006 | Omae et al. |
| 2007/0041663 A1 | 2/2007 | Cho et al. |
| 2007/0061145 A1 | 3/2007 | Edgington et al. |
| 2007/0070226 A1 | 3/2007 | Matusik et al. |
| 2007/0087756 A1 | 4/2007 | Hoffberg |
| 2007/0291958 A1 | 12/2007 | Jehan |
| 2008/0120230 A1 | 5/2008 | Lebegue et al. |
| 2009/0055139 A1 | 2/2009 | Agarwal et al. |
| 2009/0125726 A1 | 5/2009 | Iyer et al. |
| 2009/0259684 A1 | 10/2009 | Knight et al. |
| 2009/0276628 A1 | 11/2009 | Cho et al. |
| 2009/0279697 A1 | 11/2009 | Schneider |
| 2009/0290710 A1 | 11/2009 | Tkachenko et al. |
| 2009/0307489 A1 | 12/2009 | Endoh |
| 2009/0315670 A1 | 12/2009 | Naressi et al. |
| 2010/0105454 A1 | 4/2010 | Weber |
| 2010/0153747 A1 | 6/2010 | Asnaashari et al. |
| 2010/0172567 A1 | 7/2010 | Prokoski |
| 2010/0208779 A1 | 8/2010 | Park et al. |
| 2010/0246816 A1 | 9/2010 | Thomas et al. |
| 2010/0257368 A1 | 10/2010 | Yuen |
| 2010/0279766 A1 | 11/2010 | Pliska et al. |
| 2010/0322042 A1 | 12/2010 | Serletic et al. |
| 2011/0043864 A1 * | 2/2011 | Tian et al. ..................... 358/3.26 |
| 2011/0112670 A1 | 5/2011 | Disch et al. |
| 2011/0131219 A1 | 6/2011 | Martin-Cocher et al. |
| 2011/0161669 A1 | 6/2011 | Eto |
| 2011/0173208 A1 | 7/2011 | Vogel |
| 2011/0230987 A1 | 9/2011 | Anguera Miró et al. |
| 2012/0042167 A1 | 2/2012 | Marking et al. |
| 2012/0056982 A1 | 3/2012 | Katz et al. |
| 2012/0173865 A1 | 7/2012 | Swaminathan |
| 2012/0173880 A1 | 7/2012 | Swaminathan |
| 2012/0216300 A1 | 8/2012 | Vivolo et al. |
| 2012/0219229 A1 * | 8/2012 | Springer et al. .............. 382/199 |
| 2012/0321172 A1 | 12/2012 | Jachalsky et al. |
| 2013/0113881 A1 | 5/2013 | Barnum |
| 2013/0132733 A1 | 5/2013 | Agrawal et al. |
| 2013/0142330 A1 | 6/2013 | Schultz |
| 2013/0142331 A1 | 6/2013 | Schultz |
| 2013/0173273 A1 | 7/2013 | Kuntz et al. |
| 2013/0191491 A1 | 7/2013 | Kotha et al. |
| 2013/0290818 A1 | 10/2013 | Arrasvuori et al. |
| 2013/0343606 A1 | 12/2013 | Dal Mutto et al. |
| 2014/0023291 A1 * | 1/2014 | Lin ................................. 382/279 |
| 2014/0119643 A1 | 5/2014 | Price et al. |
| 2014/0135962 A1 | 5/2014 | King et al. |
| 2014/0136976 A1 | 5/2014 | King et al. |
| 2014/0140626 A1 * | 5/2014 | Cho et al. ....................... 382/199 |
| 2014/0140633 A1 | 5/2014 | Wang |
| 2014/0142947 A1 | 5/2014 | King |
| 2014/0148933 A1 | 5/2014 | King |
| 2014/0152776 A1 | 6/2014 | Cohen |
| 2014/0153816 A1 | 6/2014 | Cohen |
| 2014/0168215 A1 | 6/2014 | Cohen |
| 2014/0169660 A1 | 6/2014 | Cohen |
| 2014/0177903 A1 | 6/2014 | Price |
| 2014/0201630 A1 | 7/2014 | Bryan |
| 2014/0310006 A1 | 10/2014 | Anguera Miro et al. |

OTHER PUBLICATIONS

"Non-Final Office Action", U.S. Appl. No. 13/310,032, (Jan. 3, 2013),18 pages.

"Time Domain Pitch Scaling using Synchronous Overlap and Add ", retrieved from <http://homepages.inspire.net.nz/~jamckinnon/report/sola.htm> on Nov. 12, 2012, 3 pages.

"Waveform Similarity Based Overlap-Add (WSOLA)", retrieved from <http://www.pjsip.org/pjmedia/docs/html/group_PJMED_WSOLA.htm> on Nov. 12, 2012.

Aodha, et al., "Patch Based Synthesis for Single Depth Image Super-Resolution", Retrieved from <http://visual.cs.ucl.ac.uk/ext/depthSuperRes/ecccv2012_draft.pdf> on Nov. 28, 2012, 14 pages.

Arbelaez, et al., "Contour Detection and Hierarchical Image Segmentation", Retrieved from <http://www.cs.berkeley.edu/~arbelaez/publications/amfm_pami2011.pdf> on Nov. 28, 2012, (2011), 20 pages.

Buades, et al., "A non-local algorithm for image denoising", Retrieved from <http://bengal.missouri.edu/~kes25c/nl2.pdf > on Nov. 28 2012, (2005), 6 pages.

Cho, et al., "A Content-Aware Image Prior", Retrieved from <http://people.csail.mit.edu/taegsang/Documents/ContentAwarePrior_CVPR2010.pdf> on Nov. 28, 2012, 8 pages.

(56) References Cited

OTHER PUBLICATIONS

Cho, et al., "Blur Kernel Estimation using the Radon Transform", Retrieved from <http://people.csail.mit.edu/taegsang/Documents/RadonTransform_CVPR2011.pdf> on Nov. 28, 2012, 8 pages.
Cho, et al., "Fast Motion Deblurring", Proceedings of ACM Transactions on Graphics, vol. 28, Issue 5, (Dec. 2009), 8 pages
Cho, et al., "Image restoration by matching gradient distributions", Retrieved from <http://research.microsoft.com/en-us/um/people/larryz/choimagerestoration.pdf>, (2011), 13 pages.
Couzinie-Devy, et al., "Dictionary Learning for Deblurring and Digital Zoom", Retrieved from <http://hal.inria.fr/docs/00/62/74/02/PDF/manuscript.pdf> on Nov. 28, 2012, (Sep. 28, 2011),14 pages.
De Gotzen, Amalia et al., "Traditional (?) Implementations of a Phase-Vocoder: The Tricks of the Trade", *Proceedings of the COST G-6 Conference on Digital Audio Effects (DAFX-00)*, Verona, Italy, Dec. 7-9, 2000, retrieved from <http://128.112.136.35/courses/archive/spring09/cos325/Bernardini.pdf> on Nov. 12, 2012,(Dec. 7, 2000), 7 pages.
Dolson, Mark "The Phase Vocoder: A Tutorial", retrieved from <http://www.panix.com/~jens/pvoc-dolson.par> on Nov. 12, 2012, 11 pages.
Efros, et al., "Texture Synthesis by Non-parametric Sampling", Retrieved from <http://www.google.com/url?sa=t&rct=j&q=&esrc=s&source=web&cd=1&ved=0CDgQFjAA&url=http%3A%2F%2Fciteseerx.ist.psu.edu%2Fviewdoc%2Fdownload%3Fdoi%3D10.1.1.87.5386%26rep%3Drep1%26type%26type%3Dpdf&ei=vee_UPHcDcjligKYv4GoBw&usg=AFQjCNFzcgUrhWMQAWsicicD, (Sep. 1999), 6 pages.
Fergus, et al., "Removing Camera Shake from a Single Photograph", Retrieved from <http://people.csail.mit.edu/fergus/papers/deblur_fergus.pdf> on Nov. 28, 2012, (2006), 8 pages.
Gutierrez-Osuna, Ricardo "L19: Prosodic Modificatin of Speech", Lecture based on [Taylor, 2009, ch. 14; Holmes, 2001, ch. 5; Moulines and Charpentier, 1990], retrieved from <http://research.cs.tamu.edu/prism/lectures/sp/I19.pdf> on Nov. 12, 2012, 35 pages.
Hacohen, et al., "Image Upsampling via Texture Hallucination", Retrieved from <http://www.cs.huji.ac.il/~yoavhacohen/upsampling/upsampling.pdf> on Nov. 28, 2012, (Mar. 2010), 8 pages.
He, et al., "Corner detector based on global and local curvature properties", Retrieved from <http://hub.hku.hk/bitstream/10722/57246/1/142282.pdf> on Dec. 21, 2012, (May 2008),13 pages.
Hirsch, et al., "Fast Removal of Non-uniform Camera Shake", Retrieved from <http://webdav.is.mpg.de/pixel/fast_removal_of_camera_shake/files/Hirsch_ICCV2011_Fast%20removal%20of%20non-uniform%20camera%20shake.pdf> on Dec. 21, 2012, 8 pages.
Jia, Jiaya "Single Image Motion Deblurring Using Transparency", Retrieved from <http://www.cse.cuhk.edu.hk/~leojia/all_final_papers/motion_deblur_cvpr07.pdf> on Dec. 21, 2012, 8 pages.
Joshi, et al., "PSF Estimation using Sharp Edge Prediction", Retrieved from <http://www.google.com/url?sa=t&rct=j&q=&esrc=s&source=web&cd=1&ved=0CDAQFjAA&url=http%3A%2F%2Fciteseerx.ist.psu.edu%2Fviewdoc%2Fdownload%3Fdoi%3D10.1.1.210.4003%26rep%3Drep1%26type%3Dpdf&ei=UyK1UN-9MO_viQLb4oHQBQ&usg=AFQjCNHzEiFnMyeN9UJuiKh, CVPR,(2008), 8 pages.
Klingbeil, Michael "SPEAR: Sinusoidal Partial Editing Analysis and Resynthesis", retrieved from <http://www.klingbeil.com/spear/> on Nov. 12, 2012, 3 pages.
Krishnan, et al., "Blind Deconvolution Using a Normalized Sparsity measure", Retrieved from <http://cs.nyu.edu/~dilip/wordpress/papers/priors_cvpr11.pdf> on Nov. 28, 2012, 8 pages.
Krishnan, et al., "Fast Image Deconvolution using Hyper-Laplacian Priors", Retrieved from <http://www.cs.nyu.edu/~fergus/papers/fid_nips09.pdf> on Nov. 28, 2012, (2009), 9 pages.
Kubo, Shiro et al., "Characterization of the Tikhonov Regularization for Numerical Analysis of Inverse Boundary Value Problems by Using the Singular Value Decomposition", *Inverse Problems in Engineering Mechanics*, 1998, pp. 337-344.
Kwatra, et al., "Texture Optimization for Example-based Synthesis", Retrieved from <http://physbam.stanford.edu/~kwatra/papers/TO/TO-final.pdf> on Nov. 28, 2012, (2005), 8 pages.
Levin, et al., "Efficient Marginal Likelihood Optimization in Blind Deconvolution", Retrieved from <http://www.wisdom.weizmann.ac.il/~levina/papers/deconvLevinEtalCVPR11.pdf> on Nov. 28, 2012, (Apr. 4, 2011), 8 pages.
Levin, et al., "Image and Depth from a Conventional Camera with a Coded Aperture", *ACM Transactions on Graphics, SIGGRAPH 2007 Conference Proceedings*, San Diego, CA, Retrieved from <http://groups.csail.mit.edu/graphics/CodedAperture/CodedAperture-LevinEtAl-SIGGRAPH07.pdf> on Dec. 21, 2012,(2007), 9 pages.
Levin, et al., "Understanding and evaluating blind deconvolution algorithms", Retrieved from < http://www.wisdom.weizmann.ac.il/~levina/papers/deconvLevinEtalCVPR09>, (2009), 8 pages.
Mairal, et al., "Non-local Sparse Models for Image Restoration", Retrieved from <http://www.di.ens.fr/~fbach/iccv09_mairal.pdf> on Nov. 28, 2012, 8 pages.
Marr, D. "Vision: A computational investigation into the human representation and processing of visual information.", *New York: WH Freeman*, (1982), 6 pages.
McAulay, R. J., et al., "Speech Processing ased on a Sinusoidal Model", *The Lincoln Laboratory Journal*, vol. 1, No. 2, 1998, retrieved from <http://www.ll.mit.edu/publications/journal/pdf/vol01_no2/1.2.3.speechprocessing.pdf> on Nov. 12, 2012,(1988), pp. 153-168.
Moinet, Alexis et al., "PVSOLA: A Phase Vocoder with Synchronized Overlap-Add", *Proc. of the 14th Int. Conference on Digital Audio Effects (DAFx-11)*, Paris, France, Sep. 19-23, 2011, retrieved from <http://tcts.fpms.ac.be/publications/papers/2011/dafx2011_pvsola_amtd.pdf> on Nov. 12, 2012,(Sep. 19, 2011), 7 pages.
Ni, et al., "Example-Driven Manifold Priors for Image Deconvolution", Retrieved from <http://www.public.asu.edu/~pturaga/papers/Manifold_deconv_final_doublecolumn.pdf> on Nov. 28, 2012, 11 pages.
Patton, Joshua "ELEC 484 Project—Pitch Synchronous Overlap-Add", retrieved from <http://www.joshpatton.org/yeshua/Elec484/Elec484_files/ELEC%20484%20-%20PSOLA%20Final%20Project%20Report.pdf> on Nov. 12, 2012, 11 pages.
Portilla, et al., "A Parametric Texture Model Based on Joint Statistics of Complex Wavelet Coeffcients", Retrieved from <https://redwood.berkeley.edu/bruno/public/papers/portilla99-reprint.pdf> on Nov. 28, 2012, (Jun. 9, 2000), 23 pages.
Rodet, Xavier "Musical Sound Signal Analysis/Synthesis: Sinusoidal+Residual and Elementary Waveform Models", TFTS'97 (IEEE Time-Frequency and Time-Scale Workshop 97), Coventry, Grande Bretagne, août, 1997, retrieved from <http://articles.ircam.fr/textes/Rodet97e/index.html> on Nov. 12, 2012,(1997),16 pages.
Roelands, Marc et al., "Waveform Similarity Based Overlap-Add (WSOLA) for Time-Scale Modification of Speech: Structures and Evaluation", retrieved from <http://citeseerx.ist.psu.edu/viewdoc/summary?doi=10.1.1.58.1356> on Nov. 12, 2012, 4 pages.
Roth, et al., "Fields of Experts", Retrieved from <http://www.cs.brownedu/~black/Papers/rothIJCV09.pdf> on Nov. 28, 2012, (Nov. 17, 2008), 25 pages.
Serra, Xavier "A System for Sound Analysis/Transformation/Synthesis Based on a Deterministic Plus Stochastic Decomposition", retrieved from <https://ccrma.stanford.edu/files/papers/stanm58.pdf> on Nov. 12, 2012, (Oct. 1989), 166 pages.
Serra, Xavier "Approaches to Sinusoidal Plus Residual Modeling", retrieved from <http://www.dtic.upf.edu/~xserra/cursos/CCRMA-workshop/lectures/7-SMS-related-research.pdf> on Nov. 12, 2012, 21 pages.
Serra, Xavier "Musical Sound Modelling with Sinusoids Plus Noise", *published in C. Roads, S. Pope, A. Picialli, G. De Poli, editors. 1997. "Musical Signal Processing". Swets & Zeitlinger Publishers*, retrieved from <http://web.media.mit.edu/~tristan/Classes/MAS.945/Papers/Technical/Serra_SMS_97.pdf> on Nov. 12, 2012,(1997), 25 pages.

(56) References Cited

OTHER PUBLICATIONS

Shan, et al., "High-Quality Motion Deblurring from a Single Image", Retrieved from http://www.google.com/url?sa=t&rct=j&q=&esrc=s&source=web&cd=2&ved=0CEMQFjAB&url=http%3A%sF%2Fciteseerx.ist.su.edu%2Fviewdoc%2Fviewdoc%2Fdownload%3Fdoi%3D10.1.1.218.6835%26rep%3Drep1%26type%3Dpdf&ei=yjm1UIT6O4iLiAKTooCoAQ&usg=AFQjCNGjzsbOGrl-6NYikUK, ACM Trans. Graphics, 27(3)P:73:1-73:10,(Aug. 2008), 10 pages.

Smith III, Julius O., "MUS421/EE367B Applications Lecture 9C: Time Scale Modification (TSM) and Frequency Scaling/Shifting", retrieved from <https://ccrma.stanford.edu/~jos/TSM/TSM.pdf> on Nov. 12, 2012, (Mar. 8, 2012),15 pages.

Sun, et al., "Image Hallucination with Primal Sketch Priors", Retrieved from <http://www.google.com/url?sa=t&rct=j&q=&esrc=s&source=web&cd=1&ved=0CDUQFjAA&url=http%3A%2F%2Fciteseerx.ist.psu.edu%2Fviewdoc%2Fdownload%3Fdoi%3D10.1.1.83.3473%26rep%3Drep1%26type%3Dpdf&ei=Mzq1UJCBNYeCjAKM-YCADA&usg=AFQjCNEFVscHa2GKUOEr9rg, (2003), 8 pages.

Sun, et al., "Super-resolution from Internet-scale Scene Matching", Retrieved from <http://www.cs.brown.edu/people/lbsun/SRproj2012/SR$_{13}$ iccp2012.pdf> on Nov. 28, 2012, 12 pages.

Upperman, Gina "Changing Pitch with PSOLA for Voice Conversion", retrieved from <http://cnx.org/content/m12474/latest/?collection=col10379/1.1> on Nov. 12, 2012, 1 page.

Verhelst, Werner "Overlap-Add Methods for Time-Scaling of Speech", retrieved from <http://citeseerx.ist.psu.edu/viewdoc/summary?doi=10.1.1.128.7991> on Nov. 12, 2012, 25 pages.

Verhelst, Werner et al., "An Overlap-Add Technique Based on Waveform Similarity (WSOLA) for High Quality Time-Scale Modification of Speech", retrieved from <http://citeseerx.ist.psu.edu/viewdoc/download48 doi=10.1.1.202.5460&rep=rep1&type=pdf> on Nov. 12, 2012, 4 pages.

Weiss, "What makes a good model of natural images?", Retrieved from <http://people.csail.mit.edu/billf/papers/foe-final.pdf> on Nov. 28, 2012, 8 pages.

Xu, et al., "Two-Phase Kernel Estimation for Robust Motion Deblurring", Retrieved from <http://www.google.com/url?sa=t&rct=j&g=&esrc=s&source32 web&cd=1&ved=0CDgQFjAA&url=http%3A%2F%citeseerx.ist.psu.edu%2Fviewdoc%2Fdownload%3Fdoi%3D10.1.170.6990%26rep%3Drep1%s6type%3Dpdf&ei=z0C1UNT6EsSfiAKkm4HgDA&usg=AFQjCNExeYfpnDxf6vY-tvU, Proceedings ECCV 2010, 14 pages.

Yang, et al., "Image Super-Resolution as Sparse Representation of Raw Image Patches", Retrieved from <http://www.ifp.illinois.edu/~jyang29/papers/CVPR08-SR.pdf> Nov. 28, 2012, 8 pages.

Yuan, et al., "Image Deblurring with Blurred/Noisy Image Pairs", Proceedings of ACM SIGGRAPH, vol. 26, Issue 3, (Jul. 2007), 10 pages.

Zhang, "Close the Loop: Joint Blind Image Restoration and Recognition with Sparse Representation Prior", Retrieved from <http://www.ifp.illinois.edu/~jyang29/papers/JRR_ICCV11.pdf> on Nov. 28, 2012, 8 pages.

Zhu, et al., "Nonparametric Bayesian Texture Learning and Synthesis", Retrieved from <http://people.csail.mit.edu/leozhu/paper/testurelearning09.pdfr > on Nov. 28, 2012, 9 pages.

Zoran, et al., "From Learning Models of Natural Image Patches to Whole Image Restoration", Retrieved from <http://www.cs.huji.ac.il/~daniez/EPLLICCVCameraReady.pdf> on Nov. 28, 2012.

"Final Office Action", U.S. Appl. No. 13/309,982, (Nov. 1, 2013), 34 pages.

"Final Office Action", U.S. Appl. No. 13/310,032, (Oct. 31, 2013), 21 pages.

Felzenszwalb, Pedro F., et al., "Efficient Belief Propagation for Early Vision", *International Journal of Computer Vision*, 70(1), (2006), pp. 41-54.

Gastal, Eduardo S., et al., "Shared Sampling for Real-Time Alpha Matting", *Eurographics 2010*, vol. 29, No. 2, (2010),10 pages.

He, Kaiming et al., "A Global Sampling Method for Alpha Matting", *CVPR 2011*, (2011), pp. 2049-2056.

Levin, Anat et al., "A Closed Form Solution to Natural Image Matting", *CVPR 2006*, (2006), 8 pages.

Park, Youngja et al., "Extracting Salient Keywords from Instructional Videos Using Joint Text, Audio and Visual Cues", *Proceedings of the Human Language Technology Conference of the North American Chapter of the ACL*, Association for Computational Linguistics, 2006,(Jun. 2006), pp. 109-112.

Radhakrishnan, Regunathan et al., "A Content-Adaptive Analysis and Representation Framework for Audio Event Discovery from "Unscripted" Multimedia", Hindawi Publishing Corporation, *EURASIP Journal on Applied Signal Processing*, vol. 2006, Article ID 89013, (2006), 24 pages.

Smaragdis, Paris "A Probabilistic Latent Variable Model for Acoustic Modeling", *NIPS*(2006), 6 pages.

Smaragdis, Paris "Supervised and Semi-Supervised Separation of Sounds from Single-Channel Mixtures", *ICA'07 Proceedings of the 7th international conference on Independent component analysis and signal separation*, (2007), 8 pages.

Smith, Alvy R., et al., "Blue Screen Matting", *SIGGRAPH 96 Conference Proceedings*, (Aug. 1996), 10 pages.

Yang, Qingxiong et al., "A Constant-Space Belief Propagation Algorithm for Stereo Matching", *CVPR*, (2010), 8 pages.

"Non-Final Office Action", U.S. Appl. No. 13/682,201, Apr. 25, 2014, 14 pages.

"Non-Final Office Action", U.S. Appl. No. 13/310,032, Mar. 7, 2014, 21 pages.

"Non-Final Office Action", U.S. Appl. No. 13/309,982, Mar. 24, 2014, 35 pages.

"Non-Final Office Action", U.S. Appl. No. 13/690,755, Mar. 28, 2014, 7 pages.

"Final Office Action", U.S. Appl. No. 13/690,755, Sep. 10, 2014, 7 pages.

"Non-Final Office Action", U.S. Appl. No. 13/660,159, Oct. 1, 2014, 7 pages.

"Non-Final Office Action", U.S. Appl. No. 13/675,807, Dec. 17, 2014, 18 pages.

"Non-Final Office Action", U.S. Appl. No. 13/681,643, Jan. 7, 2015, 10 pages.

"Non-Final Office Action", U.S. Appl. No. 13/688,421, Feb. 4, 2015, 18 pages.

"Notice of Allowance", U.S. Appl. No. 13/309,982, Jul. 30, 2014, 6 pages.

"Notice of Allowance", U.S. Appl. No. 13/310,032, Aug. 26, 2014, 6 pages.

"Notice of Allowance", U.S. Appl. No. 13/682,201, Aug. 27, 2014, 4 pages.

"Restriction Requirement", U.S. Appl. No. 13/660,159, Jun. 12, 2014, 6 pages.

"Restriction Requirement", U.S. Appl. No. 13/722,825, Oct. 9, 2014, 7 pages.

"Supplemental Notice of Allowance", U.S. Appl. No. 13/310,032, Nov. 3, 2014, 4 pages.

Zhu, et al.,' "Fusion of Time-of-Flight Depth and Stereo for High Accuracy Depth Maps", IEEE Conference on Computer Vision and Pattern Recognition, Jun. 23, 2008, 8 pages.

"Corrected Notice of Allowance", U.S. Appl. No. 13/660,159, Apr. 28, 2015, 2 pages.

"Final Office Action", U.S. Appl. No. 13/681,643, May 5, 2015, 14 pages.

"MPEG Surround Specification", International Organization for Standardization, Coding of Moving Pictures and Audio; ISO/IEF JTC 1/SC 29/WG 11; Bangkok, Thailand, Jan. 19, 2006, 186 pages.

(56) References Cited

OTHER PUBLICATIONS

"Non-Final Office Action", U.S. Appl. No. 13/675,711, Mar. 11, 2015, 14 pages.
"Non-Final Office Action", U.S. Appl. No. 13/690,755, Mar. 2, 2015, 8 pages.
"Non-Final Office Action", U.S. Appl. No. 13/720,258, Mar. 3, 2015, 14 pages.
"Non-Final Office Action", U.S. Appl. No. 13/722,825, Mar. 25, 2015, 17 pages.
"Notice of Allowance", U.S. Appl. No. 13/660,159, Mar. 10, 2015, 6 pages.
"Restriction Requirement", U.S. Appl. No. 13/690,724, Feb. 26, 2015, 6 Pages.
Ioffe,"Improved Consistent Sampling, Weighted Minhash and L1 Sketching", ICDM '10 Proceedings of the 2010 IEEE International Conference on Data Mining, Dec. 2010, 10 pages.
Jehan,"Creating Music by Listening", In PhD Thesis of Massachusetts Institute of Technology, Retrieved from <http://web.media.mit.edu./~tristan/Papers/PhD_Tristan.pdf>, Sep. 2005, 137 pages.
Su,"Over-Segmentation Based Background Modeling and Foreground Detection with Shadow Removal by Using Hierarchical MRFs", Proceedings of the 10th Asian conference on Computer vision—vol. Part III, Nov. 2010, 12 pages.
Yang,"Stereo Matching with Color-Weighted Correlation, Hierarchical Belief Propagation, and Occlusion Handling", IEEE Transactions on Pattern Analysis and Machine Intelligence, vol. 31 Issue 3, Mar. 2009, 13 pages.

* cited by examiner

EDGE DIRECTION AND CURVE BASED IMAGE DE-BLURRING

BACKGROUND

As digital imaging technology has advanced, the use of digital cameras has expanded to where digital imaging can be found not only in dedicated cameras but also in various other devices such as computers, wireless phones, and so forth. While this advance in digital imaging technology has made it easier for users to take pictures using a variety of different devices, problems still remain. One such problem is that image blurring can still occur, oftentimes caused by movement of the camera while capturing the image. Such image blurring can result in frustrating user experiences as the picture the user intended to capture is not as sharp as the user was expecting or desired.

SUMMARY

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

In accordance with one or more aspects, an input image is obtained and, using a direction of each of multiple edges identified in the input image, one or more of the multiple edges are selected. Using the selected one or more edges, a blur kernel is generated based on which a de-blurred version of the input image is generated.

In accordance with one or more aspects, an input image is obtained and an indication of one or more curves in the input image is received. Each of the one or more curves has an angle within a threshold amount of a right angle in the input image. Using the indicated one or more curves, a blur kernel is generated based on which a de-blurred version of the input image is generated.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Edge direction and curve based image de-blurring is discussed herein. An image de-blurring system obtains a blurred input image and generates, based on the blurred input image, a blur kernel. The blur kernel is an indication of how the image capture device was moved (and/or how the subject captured in the image moved) during image capture, resulting in blur. Based on the blur kernel and the blurred input image, a de-blurred image is generated.

The blur kernel can be generated based on the direction of edges identified in the blurred input image. Such a blur kernel is generated by identifying edge directions of the pixels of edges identified in the blurred input image. The pixels are assigned to different groups based on their edge directions, and ones of these pixels are selected so that approximately the same number of pixels in each of the different groups is selected. The selected pixels are the basis for generating the blur kernel, resulting in a blur kernel that reflects the various edge directions associated with the different groups.

The blur kernel can additionally or alternatively be generated based on curves having a high curvature in the image (e.g., corners in the image). Curves having a high curvature in the image are identified, and ones of these identified curves are selected as the basis for generating the blur kernel. The blur kernel is generated based on these selected curves, and optionally also based on selected pixels from other edges (e.g., edges that are not curves having a high curvature).

Figure 1:
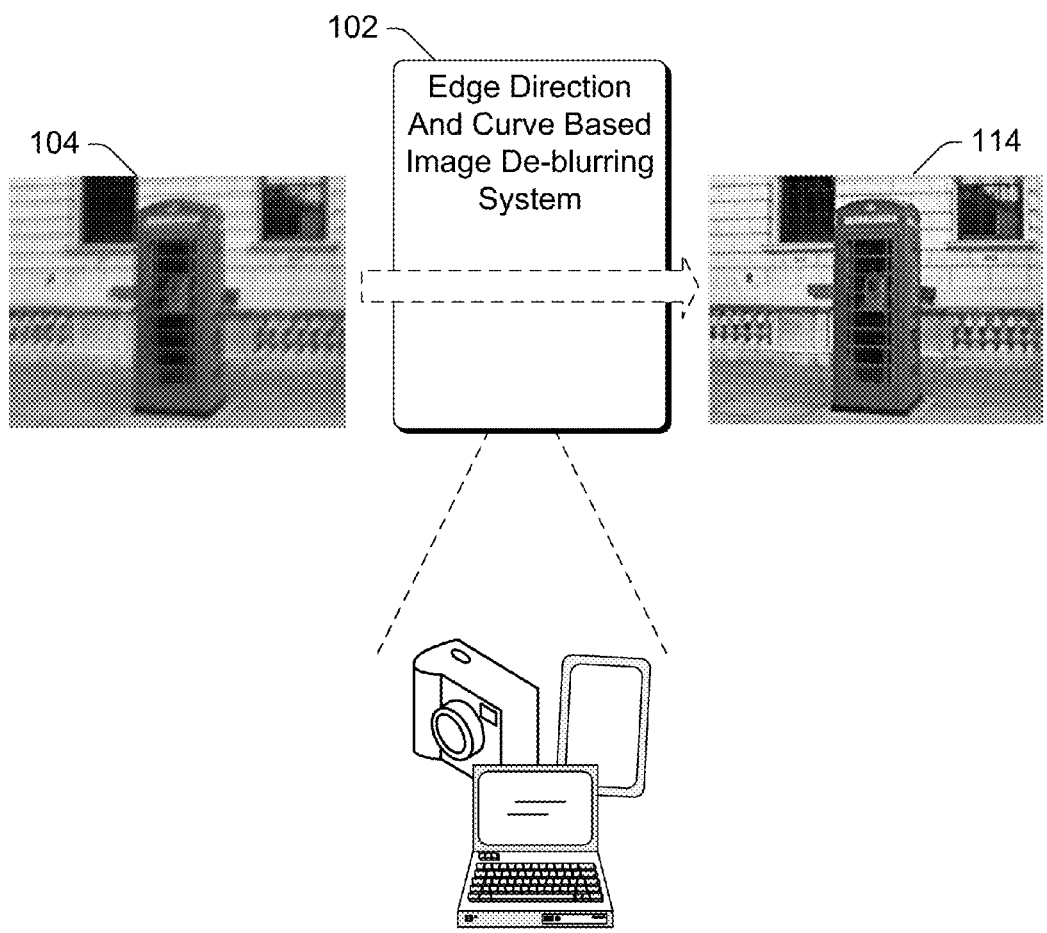
FIG. 1 is a block diagram illustrating an example service implementing the edge direction and curve based image de-blurring in accordance with one or more embodiments.

FIG. 1 is a block diagram illustrating an example edge direction and curve based image de-blurring system 102 implementing the edge direction and curve based image de-blurring in accordance with one or more embodiments. System 102 can be implemented by one or more of a variety of different types of devices that can edit or process images, also referred to as an image processing device. For example, system 102 can be implemented by a desktop computer, a server computer, a laptop or netbook computer, a tablet or notepad computer, a set-top box communicatively coupled to a display device, a television or other display device, a cellular or other wireless phone, a game console, an automotive computer, a digital camera, a scanner or copier, and so forth. System 102 can also be implemented by a virtual device, such as a virtual machine running on a physical device. A virtual machine can be run on any of a variety of different types of physical devices (e.g., any of the various types listed above). Thus, devices implementing system 102 may range from full resource devices with substantial memory and processor resources (e.g., personal computers, game consoles) to low-resource devices with limited memory and/or processing resources (e.g., digital cameras, mobile devices).

Image de-blurring system 102 processes images to de-blur the images. De-blurring an image refers to reducing the blur present in an image, also referred to as sharpening the image.

As illustrated in the example of FIG. 1, a blurred input image 104 can be obtained by system 102, which generates a corresponding de-blurred version of the image 114. Image de-blurring system 102 de-blurs images based on the directions of edges identified in the images and/or curves having a high curvature identified in the images, as discussed in more detail below.

Figure 2:
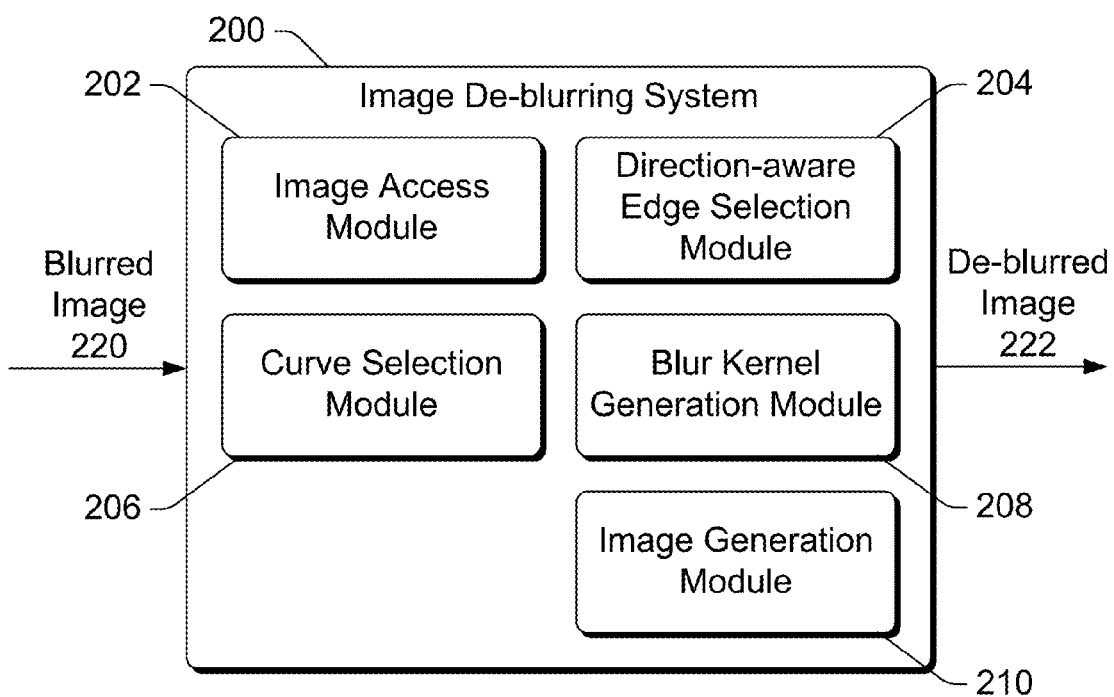
FIG. 2 illustrates an example image de-blurring system in accordance with one or more embodiments.

FIG. 2 illustrates an example image de-blurring system 200 in accordance with one or more embodiments. Image de-blurring system 200 can be, for example, an edge direction and curve based image de-blurring system 102 of FIG. 1. Similarly, image de-blurring system 102 of FIG. 1 may be an image de-blurring system 200. System 200 includes an image access module 202, a direction-aware edge selection module 204, a curve selection module 206, a blur kernel generation module 208, and an image generation module 210. Although particular functionality is discussed herein with reference to particular modules, it should be noted that the functionality of individual modules discussed herein can be separated into multiple modules, and/or at least some functionality of multiple modules discussed herein can be combined into a single module. Furthermore, it should be noted that in some situations not all of modules 202-210 need be included in system 200. For example, if system 200 supports de-blurring based on the directions of edges but not on curves having a high curvature, then system 200 need not include curve selection module 206. By way of another example, if system 200 supports de-blurring based on curves having a high curvature but not on directions of edges, then system 200 need not include direction-aware edge selection module 204.

Image access module 202 obtains an image 220, also referred to as an input image, for de-blurring. Image 220 is assumed to typically have blurring, and thus is also referred to as a blurred image. Image access module 202 can obtain image 220 in various manners and from various sources, and can obtain the image from another component of the device implementing system 200 or from a separate device. For example, module 202 can obtain the image from an image capture component, retrieve the image from a storage device coupled to the device implementing system 200, retrieve the image from a storage device accessed via a network, and so forth.

Generally, blur kernel generation module 208 generates a blur kernel used in de-blurring the image obtained by image access module 202. The blur kernel, also referred to as a point spread function (PSF), is an indication of how the image capture device was moved (and/or how the subject captured in the image moved) during image capture, resulting in blur as discussed above. How the image capture device (or subject) was moved refers to a direction of movement and an amount (e.g., distance) of movement.

To generate the blur kernel, module 208 analyzes blurred image 220 and selects one or more edges in blurred image 220 and/or one or more curves with high curvature. Given the selected edges and/or curves, module 208 predicts a sharp version of the selected edges and/or curves. Given the predicted sharp version of the selected edges and/or curves and the blurred version of the selected edges and/or curves, module 208 can readily identify the difference between sharp and blurred versions of the selected edges and/or curves, this difference being the blur kernel generated by module 208. The blur kernel is generated based on edges identified in the image and selected by direction-aware edge selection module 204 and/or curves with high curvature identified in the image and selected by curve selection module 206. The blur kernel is used by image generation module 210 to generate de-blurred image 222, which is a de-blurred version of blurred image 220.

Image generation module 210 generates a de-blurred image from a blurred image based on information obtained from the blurred image itself. Module 210 need not have access to metadata or other information describing the image capture process, the image capture device, the subject captured in the image, and so forth. This de-blurring based on information obtained from the blurred image itself is also referred to as single image de-blurring or blind de-convolution.

Figure 3:
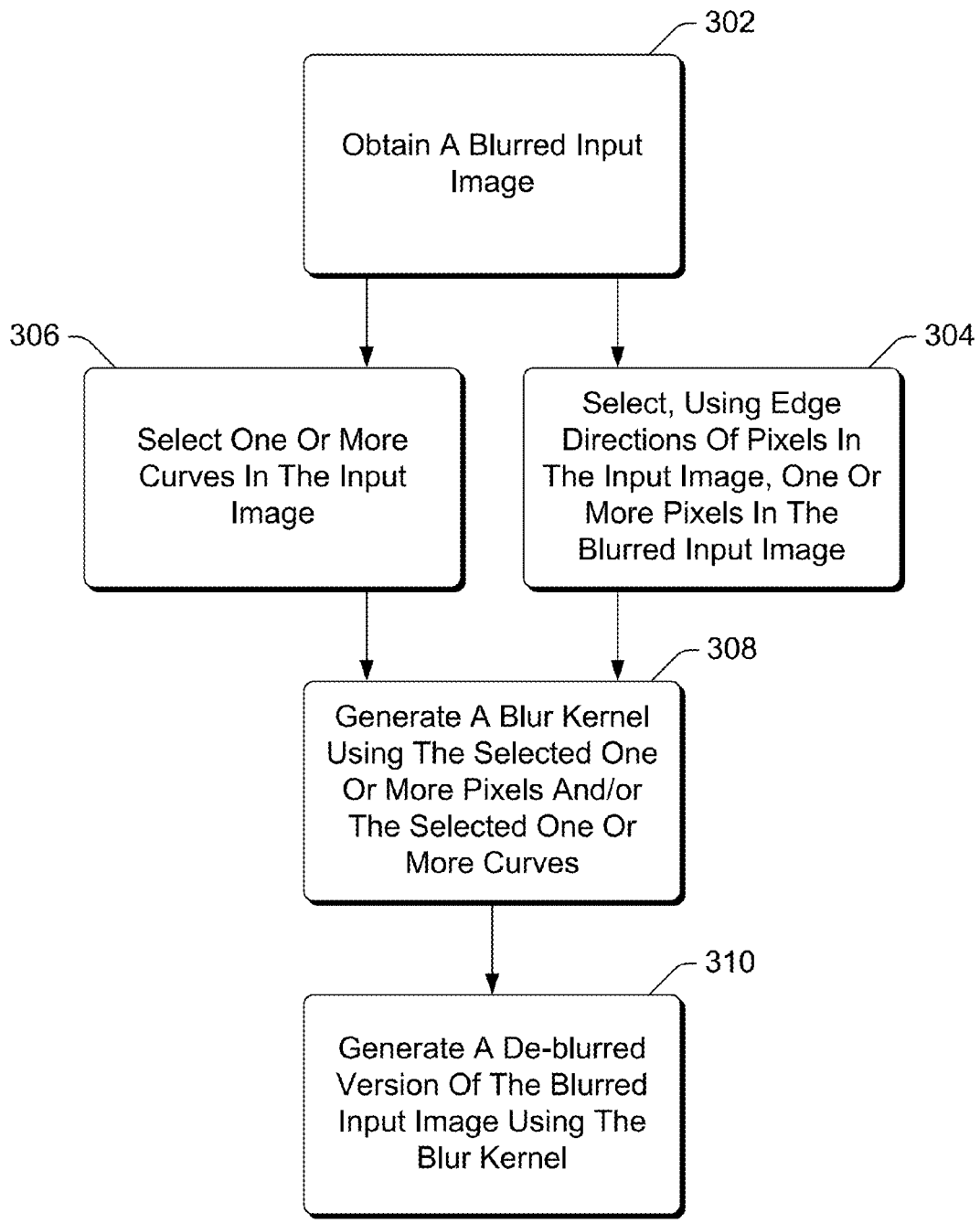
FIG. 3 is a flowchart illustrating an example process for implementing the edge direction and curve based image de-blurring in accordance with one or more embodiments.

FIG. 3 is a flowchart illustrating an example process 300 for implementing the edge direction and curve based image de-blurring in accordance with one or more embodiments. Process 300 is carried out by an image de-blurring system, such as system 102 of FIG. 1 or system 200 of FIG. 2, and can be implemented in software, firmware, hardware, or combinations thereof. Process 300 is shown as a set of acts and is not limited to the order shown for performing the operations of the various acts. Process 300 is an example process for implementing the edge direction and curve based image de-blurring; additional discussions of implementing the edge direction and curve based image de-blurring are included herein with reference to different figures.

In process 300, an input image is obtained (act 302). The input image is a blurred image for which a de-blurred version of the image is to be generated. The input image can be obtained from a variety of different sources as discussed above.

One or more of multiple pixels in the input image are selected using an edge direction of each of the multiple pixels (act 304). For example, the pixels can be assigned to various different groups based on edge direction of the pixel, and an adaptive gradient magnitude threshold used to select pixels from the various groups as discussed in more detail below.

One or more curves detected in the input image are selected (act 306). The one or more curves are curves having an angle within a threshold amount of a right angle in the input image (e.g., corners).

A blur kernel is generated using the selected one or more pixels and/or the selected one or more curves (act 308). The blur kernel is generated based on the blurred version of the selected pixels and/or curves as well as predicted sharp versions of the selected pixels and/or curves.

A de-blurred version of the blurred input image is generated using the blur kernel (act 310). The de-blurred version of the image can be readily generated given the blurred input image obtained in act 302 and the blur kernel generated in act 308, as discussed in more detail below.

It should be noted that both acts 304 and 306 can be, but need not be, performed in process 300. Thus, the blur kernel can be generated using the selected one or more pixels without using the selected one or more curves, and the blur kernel can also be generated using the selected one or more curves without using the selected one or more pixels.

The acts of FIG. 3 are discussed in additional detail below, with reference to other figures as well. Referring again to act 304, the blur kernel can be generated based on edges selected (e.g., by direction-aware edge selection module 204 of FIG. 2) taking into account the direction of pixels in the input image. The edges selected in act 304 are edges of the subject (e.g., the outline of a box, building, or other object; the perimeter of features of an object; etc.) identified in the blurred input image. An edge refers to one or more pixels each having a high gradient value, such as a gradient value that satisfies (e.g., is equal to and/or greater than) a threshold value. An edge map is generated in act 304 that identifies, for each of multiple pixels in the blurred image, the magnitude of the gradient (also referred to as the gradient value) of the pixel and the gradient direction (or simply direction) of the pixel. The direction of the pixel indicates the direction of the edge that includes the pixel, and thus is also referred to as the edge direction of the pixel. The edge direction of the pixel can be identified in various manners, such as being a particular angle relative to a reference angle (e.g., in an x,y coordinate system in which the x axis is horizontal and the y axis is vertical, the reference angle 0 degrees can be along the x axis). The edge map can identify the gradient magnitude and edge direction of each pixel in the blurred image, or alternatively only some of the pixels in the blurred image (e.g., pixels along the perimeter or border of the blurred image may not have gradient magnitudes and directions identified in the edge map). The edge map can be generated using any of a variety of publicly available and/or proprietary techniques.

Although discussed herein with reference to gradient magnitudes, other values can be used for or assigned to pixels of edges. For example, other values that provide a probability or other indication of how likely a particular pixel is to be part of an edge can be used rather than gradient magnitudes. It is to be appreciated that in the techniques discussed herein, such other values can alternatively be used in place of gradient magnitudes.

Pixels are selected in act 304 based on both the gradient magnitude and the edge direction of each pixel in the edge map. It should be noted that pixels are typically selected from all pixels in the edge map, although can alternatively be selected pixels from fewer than all pixels in the edge map. Pixels are selected so that approximately the same number of pixels in each of multiple different edge directions is selected, and an indication of those selected pixels (e.g., identifies the pixels as well as their gradient magnitudes and edge directions) is used to generate the blur kernel in act 308. Thus, because the selection is based on the edge direction of pixels, situations can arise where some of the selected pixels have smaller or lower gradient magnitudes than some pixels that are not selected.

Figure 4:
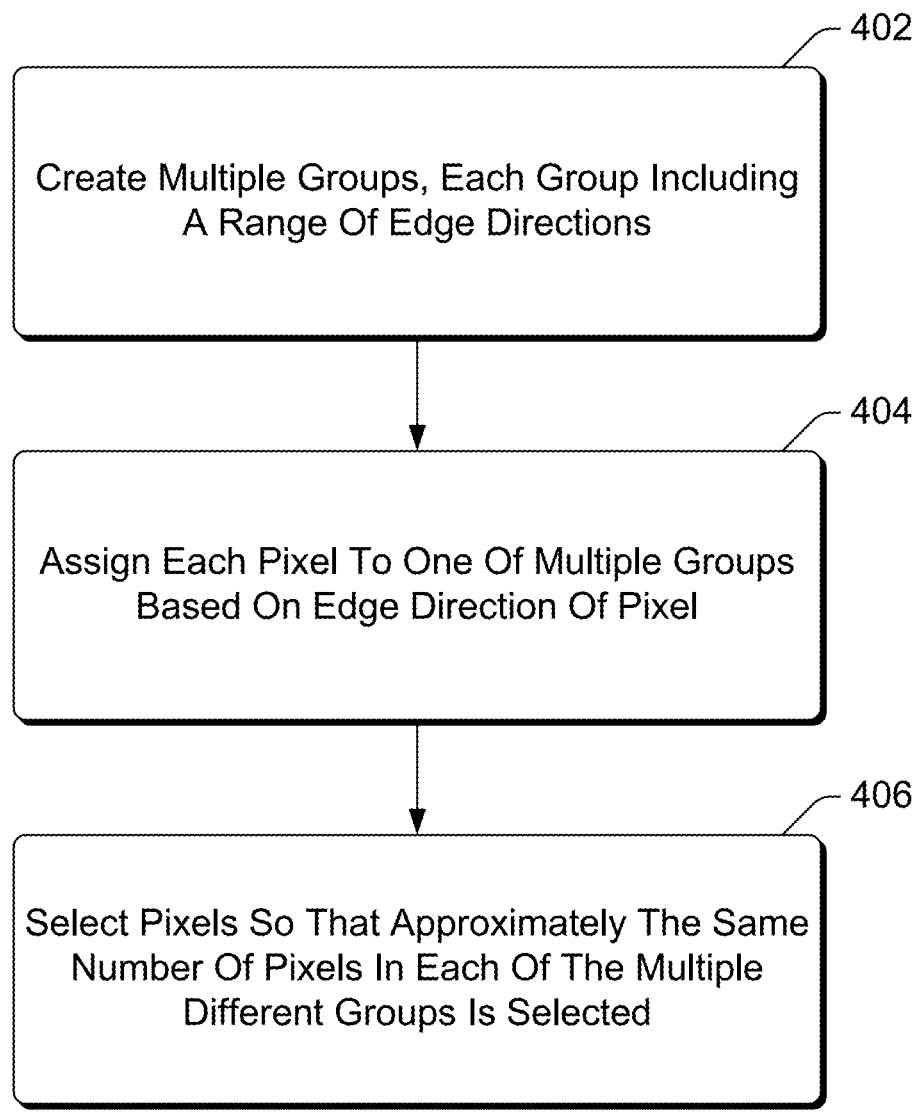
FIG. 4 is a flowchart illustrating an example process of selecting pixels using edge directions in accordance with one or more embodiments.

FIG. 4 is a flowchart illustrating an example process 400 of selecting pixels using edge directions in accordance with one or more embodiments. Process 400 can be implemented in software, firmware, hardware, or combinations thereof, and can implement, for example, act 304 of FIG. 3. In process 400, multiple groups are created (act 402) and pixels are assigned to different groups (act 404). For example, eight groups can be created, although any number of groups can be used. Each group includes a particular range of edge directions based on the angles of the edge directions. Each group typically includes approximately equal ranges, although alternatively some groups can have larger or smaller ranges than other groups. For example, each pixel can have an edge direction identified as a particular angle (e.g., in an x,y coordinate system in which the x axis is horizontal and the y axis is vertical, each pixel can have an angle from 0 to 180 degrees relative to the x axis). Thus, if eight groups were used, then pixels having edge directions at least 0 degrees but less than 22.5 degrees could be in one group, pixels having edge directions at least 22.5 degrees but less than 45 degrees could be in another group, pixels having edge directions at least 45 degrees but less than 67.5 degrees could be in yet another group, and so forth.

It should be noted that in situations in which each pixel can have an angle from 0 to 180 degrees, an angle of the line representing the edge direction can be used to determine the angle of the pixel. For example, the line representing an angle of 35 degrees would be the same as the line representing an angle of 215 degrees (180+35). Alternatively, each pixel can have an angle from 0 to 360 degrees (e.g., relative to the x axis).

Pixels are selected so that approximately the same number of pixels in each of the multiple different groups is selected (act 406). The pixels can be selected in different manners. In one or more embodiments, different threshold values are used for the gradient magnitudes of the pixels in the different groups. Thus, the techniques discussed herein are also referred to as applying or using an adaptive gradient magnitude threshold. The gradient magnitude threshold for each group is determined so that approximately the same number (e.g., the same number, numbers within a fixed threshold difference (e.g., 150), numbers within a relative threshold difference (e.g., 25%), etc.) of pixels is selected from each group. For each group the pixels having gradient magnitudes that satisfy (e.g., are equal to and/or greater than) the gradient magnitude threshold of that group are selected for use in generating the blur kernel. Thus, pixels are selected based on both their edge directions and their gradient magnitudes, rather than based on their gradient magnitudes alone.

Alternatively, rather than determining gradient magnitude thresholds for each group, a particular number of pixels in each group can be selected. For example, a particular number (e.g., 400) of the pixels in each group that have the largest gradient magnitudes can be selected for use in generating the blur kernel.

Returning to FIG. 3 and referring again to act 306, in addition to and/or in place of using pixels selected using edge directions in act 304, the blur kernel can be generated based on curves with high curvature in the input image. These curves selected in act 306 are curves identified in the blurred input image obtained in act 302, and can be selected by, for example, curve selection module 206 of FIG. 2. A curve with high curvature refers to a curve in the input image, typically where two edges meet or where an edge changes directions, that includes a corner or approximately a corner shape (e.g., a curve having an angle that is a right angle or that is within a threshold amount, such as 3 degrees, of a right angle).

Figure 5:
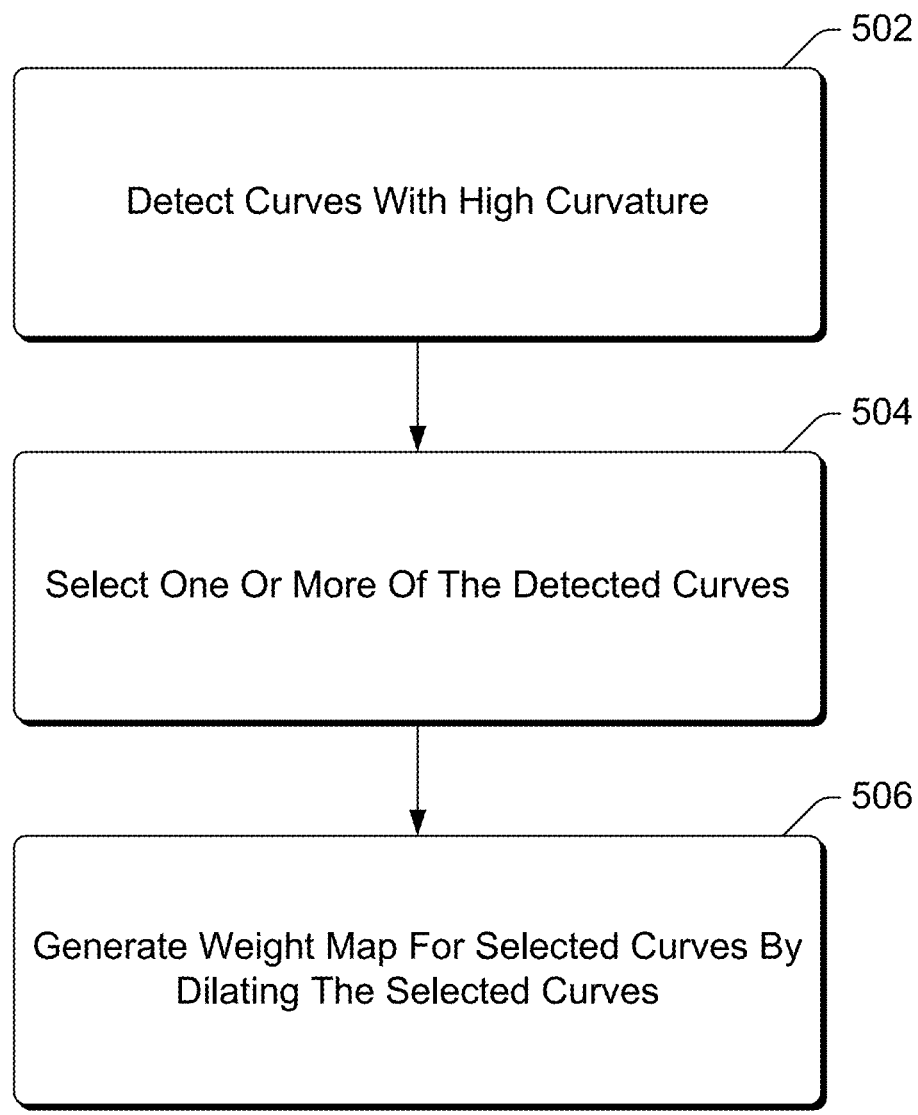
FIG. 5 is a flowchart illustrating an example process of selecting curves in accordance with one or more embodiments.

FIG. 5 is a flowchart illustrating an example process 500 of selecting curves in accordance with one or more embodiments. Process 500 can be implemented in software, firmware, hardware, or combinations thereof, and can implement, for example, act 306 of FIG. 3. In process 500, curves with high curvature are detected (act 502). The curves with high curvature can be detected using any of a variety of publicly available and/or proprietary techniques.

In one or more embodiments, curves with high curvature are detected by first detecting edges in the image to obtain a binary edge map. The edges can be detected in various manners, such as using a Canny edge detector, and contours of the edges are then extracted using a curvature scale space (CSS) technique. Given the extracted contours, the curvature for each contour is computed at a fixed low scale to retain the true corners, and the local maxima of absolute curvature are regarded as corner candidates. A threshold is adaptively computed according to the mean curvature within a region of support, and round corners are removed by comparing the curvature of corner candidates with the adaptive threshold. The angles of the remaining corner candidates are evaluated based on a dynamically recalculated region of support to eliminate false corners. After eliminating false corners, the end points of open contours in the remaining corner candidates are then considered and kept as corner candidates unless they are very close to (e.g., within a threshold number of pixels of) another corner. The remaining corner candidates after considering end points of open contours are the detected curves.

Figure 6:
FIG. 6 illustrates an example image including curves with high curvature in accordance with one or more embodiments.

FIG. 6 illustrates an example image 600 including curves with high curvature in accordance with one or more embodiments. Numerous curves with high curvature are identified in image 600, the curves being illustrated in FIG. 6 by squares surrounding the curves. Thus, for example, curves with high curvature are identified at corners of square tiles or concrete on the sidewalk illustrated in image 600, at corners of panes of glass in windows or the telephone booth in image 600, and so forth.

Returning to FIG. 5, one or more of the curves detected in act 502 are selected (act 504). In one or more embodiments, curves are used to generate the blur kernel in situations in which the pixels selected in act 304 of FIG. 3 are deemed (e.g., by direction-aware edge selection module 204 and/or blur kernel generation module 208 of FIG. 2) to be insufficient. The pixels selected in act 304 can be deemed to be insufficient for various reasons, such as if the gradient magnitude threshold value for one or more groups is equal to and/or less than a particular value, if there are fewer than a threshold number of pixels in one or more groups, and so forth.

Curves with high curvature can be selected regardless of the edge directions of edges in the curves, or alternatively based on the edge directions of edges in the curves. In one or more embodiments, the curves selected in act 504 are curves with high curvature that include an edge with pixels in a group selected in act 304 of FIG. 3 that are deemed to be insufficient. For example, if the gradient magnitude threshold value for a particular group is equal to and/or less than a particular value, then curves with high curvature that include pixels in that particular group are selected in act 504. Alternatively, other rules or criteria can be used to select the curves (e.g., select all curves detected in act 502).

A weight map based on the selected curves is also generated (act 506). In one or more embodiments the weight map is generated by dilating the selected curves, resulting in a map in which pixels of one color (e.g., white) represent pixels that are part of a curve with high curvature, and pixels of another color (e.g., black) represent pixels that are not part of a curve with high curvature. The weight map assigns different weights to different pixels, with pixels in regions that include curves with high curvature being assigned larger weights than pixels in regions that do not include curves with high curvature. The weight map can be generated using any of a variety of publicly available and/or proprietary techniques.

The weight map is generated by identifying locations in the input image that include pixels that are part of a curve with high curvature. The curves identified in the weight map are expanded or dilated by a particular radius (e.g., 2). Thus, for example, the weight map identifies, as locations that include pixels that are part of a curve with high curvature, each location identified in the weight map as being part of a curve with high curvature as well as each location within the particular radius (e.g., 2 pixels) of a location identified in the weight map as being part of a curve with high curvature.

Figure 7:
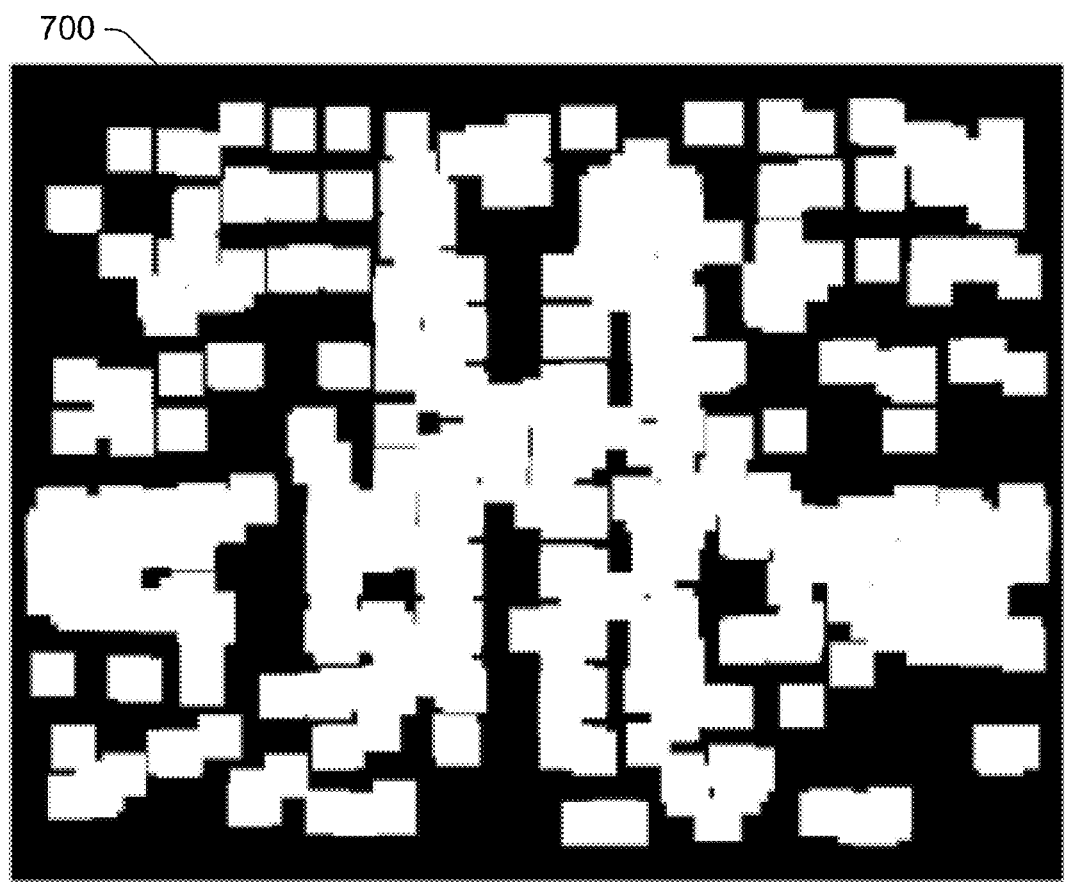
FIG. 7 illustrates an example weight map corresponding to the image of FIG. 6 in accordance with one or more embodiments.

FIG. 7 illustrates an example weight map 700 corresponding to image 600 of FIG. 6 in accordance with one or more embodiments. Numerous curves with high curvature are identified in image 600, as discussed above. The weight map is generated, after dilating the curves identified in image 600, resulting in weight map 700. In weight map 700, pixels that are part of a dilated curve with high curvature are identified in white, and pixels that are not part of a dilated curve with high curvature are identified in black.

Returning to FIG. 3, in act 308 the blur kernel is generated based on the pixels selected using edge directions in act 304 and/or the curves selected in act 306. In generating the blur kernel based on the pixels selected using edge directions in act 304, first-order derivatives of the selected pixels are calculated. The first-order derivatives of the pixels provide an indication of the direction or trajectory of the blur in the blurred image, and the blur kernel is generated by reducing (e.g., minimizing) an energy function based on the first-order derivatives.

In generating the blur kernel based on the curves selected in act 306, second-order derivatives of the selected curves are calculated. The second-order derivatives of the curves provide an indication of the direction or trajectory of the blur, with the second-order derivatives of curves that are sharp being approximately dots or single points and the second-order derivatives of curves that are blurred identifying the direction or trajectory of the blur. The blur kernel is generated by reducing (e.g., minimizing) an energy function based on the second-order derivatives to generate the blur kernel.

Figure 8:
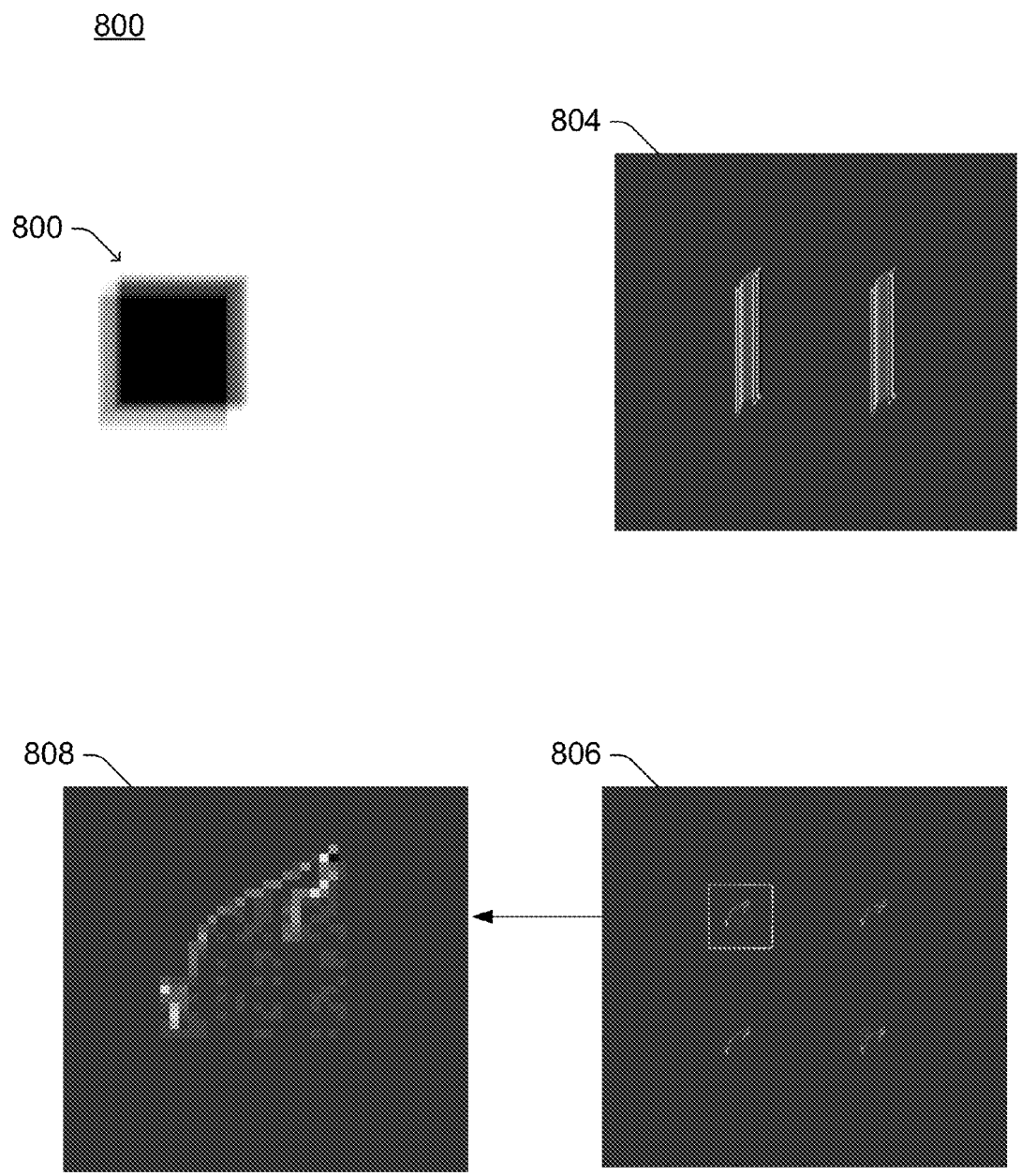
FIG. 8 illustrates an example of the effects of first-order and second-order derivatives in generating the blur kernel in accordance with one or more embodiments.

FIG. 8 illustrates an example 800 of the effects of the first-order and second-order derivatives in generating the blur kernel in accordance with one or more embodiments. FIG. 8 illustrates a blurred input image 802, which is a blurred square. The first-order derivative 804 identifies the trajectory of the blur with lines having lighter or brighter portions to indicate directions of greater movement than darker portions. The first-order derivative 804 is the first-order derivative of the pixels selected using edge directions in act 304 of FIG. 3.

The second-order derivative 806 identifies the trajectory of the blur with points having lighter or brighter portions to indicate directions of greater movement than darker portions. The second-order derivative 806 is the second-order derivative of the curves with high curvature selected in act 306 of FIG. 3. The second-order derivative 808 is a zoomed-in illustration of a portion of the second-order derivative 806 surrounded by the dashed box in second-order derivative 806.

The blur kernel is generated by reducing (e.g., minimizing) an energy function that identifies a similarity between the blurred input image (e.g., blurred image 220 of FIG. 2) and the result of the blur kernel convolved with a de-blurred version of the image. The energy function includes three terms: a first convolution term, a second convolution term, and a regularization term. The first convolution term indicates that the blur kernel being generated is to, when convolved with the first-order derivative of a predicted sharp version of the blurred image, be at least approximately the same (e.g., the same or approximately the same) as the first-order derivative of the input image (e.g., blurred image 220 of FIG. 2). The second convolution term indicates that the blur kernel being generated is to, when convolved with the second-order derivative of a predicted sharp version of the blurred image, be at least approximately the same (e.g., the same or approximately the same) as the second-order derivative of the input image (e.g., blurred image 220 of FIG. 2). The regularization term assists in keeping the blur kernel smooth.

In one or more embodiments, the blur kernel is generated by reducing (e.g., minimizing) the following energy function:

$$f_K(K) = \sum_{(P_*, B_*)} \lambda_* \|P_* * K - B_*\|^2 + \sum_{(P_t, B_t)} \lambda_t \|W(P_t * K - B_t)\|^2 + \beta \|K\|^2 \quad (1)$$

where W refers to the weight map, K refers to the blur kernel, $\lambda_*$ refers to a weight for each first-order partial derivative and $\lambda_* \in (\lambda_1, \lambda_2)$, $\lambda_t$ refers to a weight for each second-order derivative and $\lambda_t \in (\lambda_3, \lambda_4, \lambda_5)$, P refers to the selected pixels in a predicted sharp version of the blurred image (pixels selected using edge directions and/or pixels that are part of a selected curve), B refers to the selected pixels in the blurred input image (pixels selected using edge directions and/or pixels that are part of a selected curve), (P*, B*) refers to the first-order derivative of the predicted sharp and blurred versions of the image, $(P_t, B_t)$ refers to the second-order derivative of the predicted sharp and blurred versions of the image, and β refers to a positive scalar for a regularization term. In one or more embodiments, $\lambda_*$ is set to 1 (e.g., $\lambda_1$ is set to 1 and $\lambda_2$ is set to 1), $\lambda_t$ is set to 4 times $\lambda_*$ (e.g., $\lambda_3$ is set to 4, $\lambda_4$ is set to 4, and $\lambda_5$ is set to 4), and β is set to 5, although other values can alternatively be used. The predicted sharp version of the image P can be determined using any of a variety of publicly available and/or proprietary techniques to predict or estimate the sharp version of the image.

The energy function (1) includes a regularization term that assists in keeping the blur kernel smooth. In one or more embodiments, this regularization term is the Tikhonov regularization term $\oplus \|K\|^2$, although other regularization terms can alternatively be used.

The first-order derivative (P*, B*) and second-order derivative $(P_t, B_t)$ can be defined as:

$$(P^*, B^*) \in \{(P_x, \partial_x B), (P_y, \partial_y B)\} \quad (2)$$

$$(P_t, B_t) \in \{(\partial_x P_x, \partial_{xx} B), (\partial_x P_y, \partial_{xy} B), (\partial_y P_y, \partial_{yy} B)\} \quad (3)$$

These first and second order derivatives are treated differently in generating the blur kernel, as indicated above in the energy function (1). As can be seen from the energy function (1), when using the energy function (1) the blur kernel is estimated using derivatives of the pixel values instead of the pixel values themselves.

The first term of the energy function (1) is an energy term based on the first-order derivatives of the pixels selected based on edge directions. The second term of the energy function (1) is an energy term based on the second-order derivatives of the selected curves. The energy function (1) generates the blur kernel based on both the pixels selected based on edge directions and the selected curves. In situations in which the blur kernel is generated based on the pixels selected based on edge directions but not the selected curves, the second term need not be included in the energy function (1). Similarly, in situations in which the blur kernel is generated based on the selected curves but not the pixels selected based on edge directions, the first term need not be included in the energy function (1).

The energy function (1) can be solved in various different manners. In one or more embodiments, the energy function (1) is solved based on the energy function (1) being rewritten in a matrix form, resulting in the following matrix form energy function:

$$\|A^*k - b^*\|^2 + \|W(A_t k - b_t)\|^2 \beta \|k\|^2 = (A^*k - b^*)^T(A^*k - b^*) + (A_t k - b_t)^T W^T W(A_t k - b_t) + \beta k^T k \quad (4)$$

where $A_*$ refers to a matrix consisting of $P_*$, $A_t$ refers to a matrix consisting of $P_t$, k refers to a vector form of the blur kernel K, $b_*$ refers to a vector consisting of $B_*$, and $b_t$ refers to a vector consisting of $B_t$.

A conjugate gradient method is used to approximately optimize the matrix form energy function. The gradient of $f_k$ is defined as:

$$\frac{\partial f_k(k)}{\partial k} = 2A_*^T A_* k - 2A_*^T b_* + 2A_t^T W^T W A_t k - 2A_t^T W^T W b_t + 2\beta k \quad (5)$$

The blur kernel is generated in act 308 by iteratively computing the gradient $f_k$ in reducing (e.g., minimizing) the energy function (1).

The second-order derivative $(P_t, B_t)$ defined in statement (3) above relies on the curves with high curvature being formed by a horizontal edge and a vertical edge. Alternatively, a rotation angle of the curves can be incorporated into the second-order derivative. The rotation angle of a curve can be determined (e.g., in act 306) using any of a variety of publicly available and/or proprietary techniques. The rotation angle of a curve can be identified in various manners, such as being the angle of an edge of the curve relative to a reference angle, being an angle within the arc of the curve, and so forth. For example, in an x,y coordinate system in which the x axis is horizontal and the y axis is vertical, the reference angle 0 degrees can be along the x axis. The second-order derivative can be expanded to account for the rotation angle of the curves as follows:

$$(P_t, B_t) \in \{(\partial_x P_x, \partial_{xx} B), (\partial_x P_y, \partial_{xy} B), (\partial_y P_y, \partial_{yy} B), (a\partial_{xx} B + b\partial_{yy} B)\} \quad (6)$$

where a and b can be automatically determined for a curve based on the orientation of the curve, and can be any value between 0 and 1. The values a and b identify the rotation angle of the curve (e.g., between 0 degrees and 180 degrees), and can be determined in various manners (e.g., by extracting a dominant gradient direction for the curve and using that dominant gradient direction as the value of a and b). The second-order derivatives are expanded to include a linear combination of the second-order derivative to describe the rotation angle.

Figure 9:
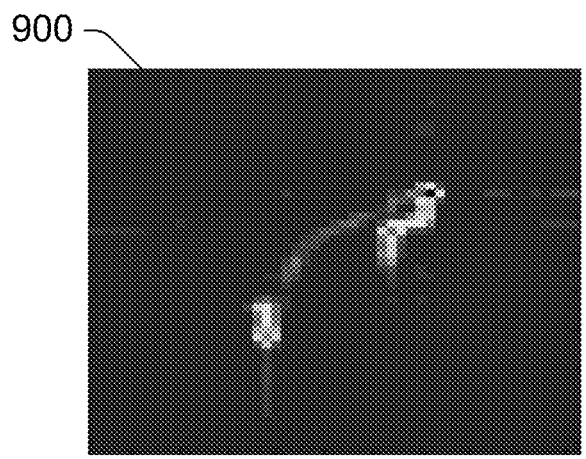
FIGS. 9 and 10 illustrate example blur kernels generated for a blurred input image in accordance with one or more embodiments.

FIG. 9 illustrates an example blur kernel 900 generated for a blurred input image in accordance with one or more embodiments. Blur kernel 900 is generated for blurred input image 104 of FIG. 1, with lighter or brighter portions of blur kernel 900 indicating directions of greater movement than darker portions of blur kernel 900. Blur kernel 900 is generated using the energy function (1) without the second term, so the blur kernel 900 is generated based on the pixels selected based on edge directions but not on the selected curves.

Figure 10:
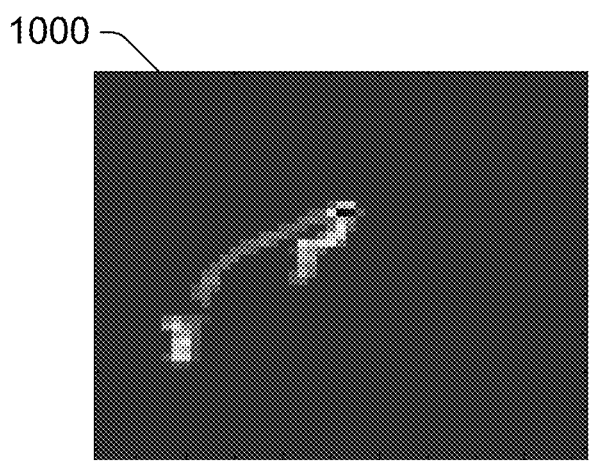

FIG. 10 illustrates another example blur kernel 1000 generated for a blurred input image in accordance with one or more embodiments. Blur kernel 1000 is generated for blurred input image 104 of FIG. 1, with lighter or brighter portions of blur kernel 1000 indicating directions of greater movement than darker portions of blur kernel 1000. Blur kernel 1000 is generated using the energy function (1) with the first, second, and third terms, so the blur kernel 1000 is generated based on the pixels selected based on edge directions as well as based on the selected curves.

Returning to FIG. 3, given the blur kernel generated in act 308, a de-blurred version of the blurred input image is generated in act 310. The de-blurred version of the image can then be output (e.g., as de-blurred image 222 of FIG. 2). The de-blurred version of the image can be output in various manners, such as displaying the image, storing the image in a storage device, communicating the image to another device for display or storage, communicating the image to another device or component for further processing, and so forth.

The de-blurred version of the blurred input image is generated using the following model:

$$B = L \otimes K + N \quad (7)$$

where B refers to an input blurred image (e.g., blurred image 220 of FIG. 2), L refers to a latent sharp image (a de-blurred version of the input blurred image, e.g., de-blurred image 222 of FIG. 2), $\otimes$ is the convolution operator, K refers to a blur kernel, and N refers to noise. Using this model, it can be readily seen that using de-convolution, given a blurred image and a blur kernel for the blurred image, a de-blurred version of the blurred image can be readily generated.

The blur kernel K is generated based on edges of blurred image B (edges selected based on their directions) and/or curves of blurred image B with high curvature, as discussed above. An estimated latent sharp image L can be determined using any of a variety of publicly available and/or proprietary techniques that predict or estimate the sharp version of the image. For example, an iterative process that alternately approximately optimizes the estimated latent sharp image L and the blur kernel K can be used to determine both the latent sharp image L and the blur kernel K, with the blur kernel K determined in the final iteration being used to generate de-blurred image 222 from the blurred image 220 of FIG. 2. This iterative process progressively refines the blur kernel K, and can be performed using any of a variety of publicly available and/or proprietary techniques.

In one or more embodiments, the iterative process for generating the estimated latent sharp image L and the blur kernel K is as follows. To progressively refine the blur kernel K and the latent sharp image L, three steps are iterated: prediction, kernel estimation, and de-convolution. Prediction is performed first in each iteration, providing an initial value of L for blur kernel estimation. The input of the prediction (the image from which the gradient maps are computed) is the blurred image B in the first iteration, and in other iterations is the estimate of L obtained in the de-convolution step of the previous iteration. In the prediction step, gradient maps of L are computed along the x and y directions, which predict salient edges in L with noise suppression in smooth regions, resulting in image L in which the salient edges remain and the other regions have zero gradients. Bilateral filtering is applied to the current estimate of L to suppress possible noise and small details, and a shock filter is then used to restore strong edges in L, The result of the shock filtering, referred to as L', includes high-contrast edges and enhanced noise, and the noise is removed by computing and thresholding the gradient maps $\{\partial_x L', \partial_y L'\}$ of L'.

The threshold for truncating gradients can be determined as follows. To estimate an m×m blur kernel, information of blurred edges in at least m different directions is obtained. Histograms of gradient magnitudes and directions for each $\partial L'$ are constructed. Angles are quantized by 45 degrees, and gradients of opposite directions are counted together. A threshold is found that keeps at least rm pixels from the largest magnitude for each quantized angle. The value of r can be 2, or alternatively other values. To include more gradient values as the iteration progresses, the threshold determined at the beginning of the iteration process is gradually decreased (e.g., by multiplying by 0.9 in each iteration after the first iteration).

In the kernel estimation step, the blur kernel K is generated (e.g., in act 308 of FIG. 3) using the edges selected based on edge directions of pixels and/or using selected curves, as discussed above. In the de-convolution step, an estimate of the latent sharp image L is generated based on the blur kernel K generated in the previous kernel estimation step and an image B (the blurred image B in the first iteration and in subsequent iterations the estimated latent sharp image L from the previous de-convolution step). The de-convolution can be performed using any of a variety of publicly available and/or proprietary techniques.

It should be noted that, in situations in which an iterative process is used to generate the de-blurred version of the blurred input image, process 300 can be performed in each iteration. A blur kernel can thus be generated in each iteration, and the blurred input image from which the one or more curves with high curvature are selected in act 306 and/or pixels are selected using edge directions in act 304 can be the blurred image 220 of FIG. 2 for the first iteration, and for subsequent iterations can be a de-blurred version of the blurred input image generated in the previous iteration.

Various actions performed by various modules are discussed herein. A particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 11:
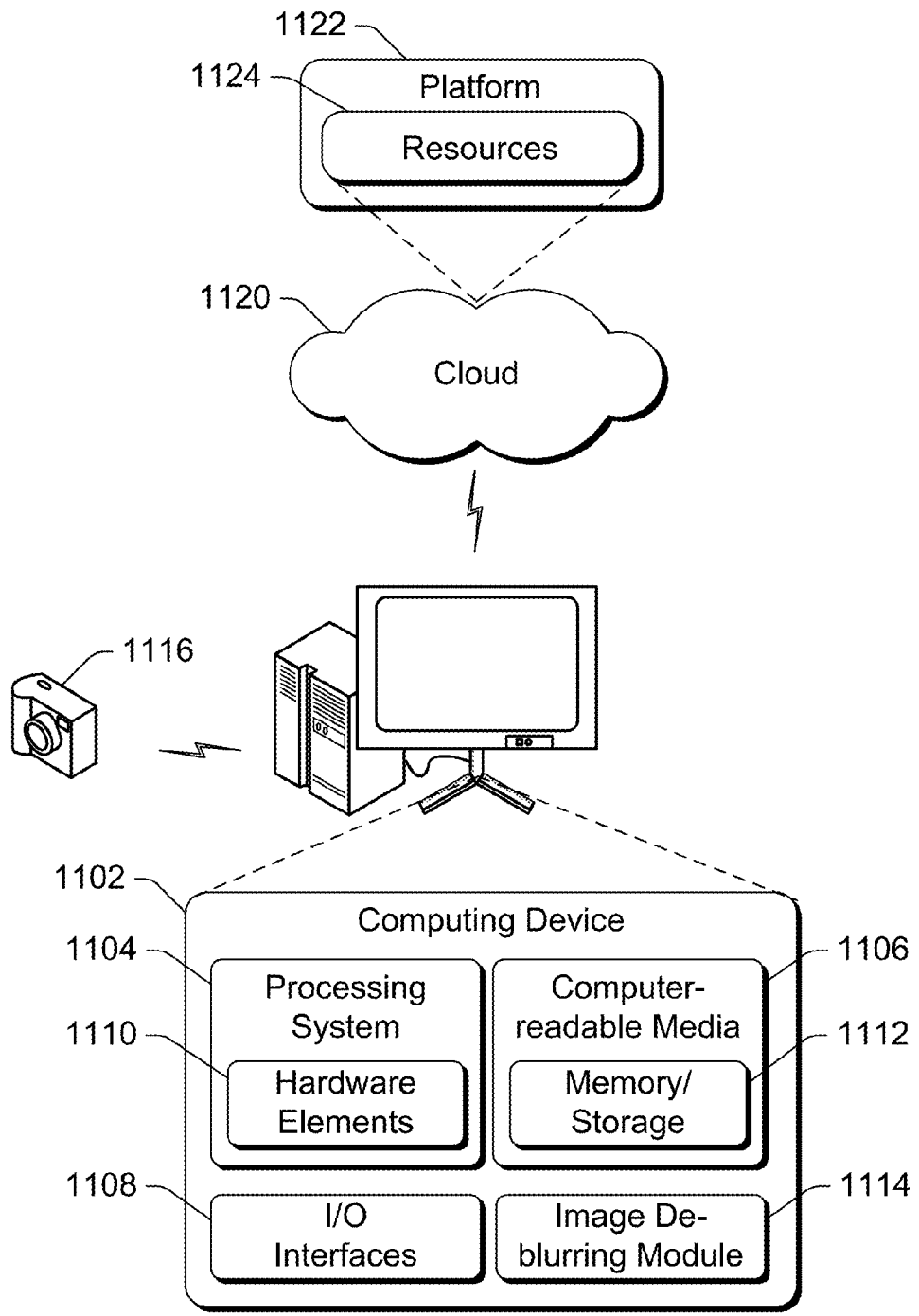
FIG. 11 illustrates an example system that includes an example computing device that is representative of one or more computing systems and/or devices that may implement the various techniques described herein.

FIG. 11 illustrates an example system generally at 1100 that includes an example computing device 1102 that is representative of one or more computing systems and/or devices that may implement the various techniques described herein. This is illustrated through inclusion of the image de-blurring module 1114, which may be configured to reduce the blur present in images, such as an image captured by an image capture device 1116. Computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

Processing system 1104 is representative of functionality to perform one or more operations using hardware. Accordingly, processing system 1104 is illustrated as including hardware elements 1110 that may be configured as processors, functional blocks, and so forth. This may include implementation in hardware as an application specific integrated circuit or other logic device formed using one or more semiconductors. Hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

Computer-readable storage media 1106 is illustrated as including memory/storage 1112. Memory/storage 1112 represents memory/storage capacity associated with one or more computer-readable media. Memory/storage component 1112 may include volatile media (such as random access memory (RAM)) and/or nonvolatile media (such as read only memory (ROM), Flash memory, optical disks, magnetic disks, and so forth). Memory/storage component 1112 may include fixed media (e.g., RAM, ROM, a fixed hard drive, and so on) as well as removable media (e.g., Flash memory, a removable hard drive, an optical disc, and so forth). Computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by computing device 1102. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. Computing device 1102 may be configured to implement particular instructions and/or functions corresponding to the software and/or hardware modules. Accordingly, implementation of a module that is executable by computing device 1102 as software may be achieved at least partially in hardware, e.g., through use of computer-readable storage media and/or hardware elements 1110 of processing system 1104. The instructions and/or functions may be executable/operable by one or more articles of manufacture (for example, one or more computing devices 1102 and/or processing systems 1104) to implement techniques, modules, and examples described herein.

The techniques described herein may be supported by various configurations of computing device 1102 and are not limited to the specific examples of the techniques described herein. This functionality may also be implemented all or in part through use of a distributed system, such as over a "cloud" 1120 via a platform 1122 as described below.

Cloud 1120 includes and/or is representative of a platform 1122 for resources 1124. Platform 1122 abstracts underlying functionality of hardware (e.g., servers) and software resources of cloud 1120. Resources 1124 may include applications and/or data that can be utilized while computer processing is executed on servers that are remote from computing device 1102. Resources 1124 can also include services provided over the Internet and/or through a subscriber network, such as a cellular or Wi-Fi network.

Platform 1122 may abstract resources and functions to connect computing device 1102 with other computing devices. Platform 1122 may also serve to abstract scaling of resources to provide a corresponding level of scale to encountered demand for resources 1124 that are implemented via platform 1122. Accordingly, in an interconnected device embodiment, implementation of functionality described herein may be distributed throughout system 1100. For example, the functionality may be implemented in part on computing device 1102 as well as via platform 1122 that abstracts the functionality of the cloud 1120.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a device, the method comprising:
   obtaining an input image;
   obtaining an edge direction for each of multiple pixels identified in the input image;
   selecting, by the device and using the edge direction of each of the multiple pixels, one or more of the multiple pixels, the selecting including:

assigning each of the multiple pixels to one of multiple groups based on an angle of the edge direction of the pixel, and selecting, as the one or more pixels, a number of pixels from each of the multiple groups, the numbers of pixels selected from the multiple groups being within a threshold difference of one another; and generating, by the device and using the selected one or more pixels, a blur kernel based on which a de-blurred version of the input image is generated.

2. A method as recited in claim 1, the method further comprising obtaining gradient magnitudes for each of the multiple pixels.

3. A method as recited in claim 2, the selecting the number of pixels from each of the multiple groups comprising:

applying an adaptive gradient magnitude threshold to the multiple groups so that different groups can have different gradient magnitude thresholds; and selecting, as the one or more of the multiple pixels, pixels from the multiple groups having gradient magnitudes that satisfy the gradient magnitude threshold for the group.

4. A method as recited in claim 3, further comprising determining for each group a gradient magnitude threshold so that the selecting pixels from the multiple groups comprises selecting approximately the same number of pixels from each of the multiple groups.

5. A method as recited in claim 3, wherein at least one pixel selected from one of the multiple groups has a lower gradient magnitude than a pixel not selected from another of the multiple groups.

6. A method as recited in claim 1, further comprising:

receiving an indication of one or more curves each having an angle within a threshold amount of a right angle in the input image; and the generating comprising generating, using the selected one or more pixels and the indicated one or more curves, the blur kernel.

7. A method as recited in claim 6, the generating further comprising generating the blur kernel by reducing an energy function based on second-order derivatives of the one or more curves.

8. A method as recite in claim 7, the energy function being further based on first-order derivatives of the selected one or more pixels.

9. One or more computer-readable storage media having stored thereon multiple instructions that, when executed by one or more processors of a computing device, cause the one or more processors to:

obtain an input image;

select one or more curves each having an angle within a threshold amount of a right angle in the input image; and generate, using the selected one or more curves, a blur kernel based on which a de-blurred version of the input image is generated, the blur kernel being generated by reducing an energy function that includes pixels that are part of the selected one or more curves but excludes pixels that are not part of the selected one or more curves.

10. One or more computer-readable storage media as recited in claim 9, wherein to generate the blur kernel is further to generate, based on the selected one or more curves and one or more pixels of edges in the input image, the blur kernel.

11. One or more computer-readable storage media as recited in claim 10, the multiple instructions further causing the one or more processors to select, using an edge direction of each of multiple pixels in the input image, the one or more pixels.

12. One or more computer-readable storage media as recited in claim 10, the multiple instructions further causing the one or more processors to obtain both gradient magnitudes and edge directions for each of the one or more pixels.

13. One or more computer-readable storage media as recited in claim 12, the multiple instructions further causing the one or more processors to:

assign each of the multiple pixels to one of multiple groups based on an angle of the edge direction of the pixel;

apply an adaptive gradient magnitude threshold to the multiple groups so that different groups can have different gradient magnitude thresholds; and select, as the one or more pixels, pixels from the multiple groups having gradient magnitudes that satisfy the gradient magnitude threshold for the group.

14. One or more computer-readable storage media as recited in claim 9, wherein to generate the blur kernel is to generate the blur kernel by reducing the energy function based on second-order derivatives of the one or more curves.

15. One or more computer-readable storage media as recited in claim 14, the energy function being further based on first-order derivatives of one or more pixels of edges identified in the input image.

16. One or more computer-readable storage media as recited in claim 14, the energy function being further based on, for each of the one or more curves, a rotation angle of the curve.

17. A system comprising:

an image access module configured to obtain an input image;

an edge selection module configured to:

obtain an edge direction for each of multiple pixels identified in the input image, select, using the edge direction of each of the multiple pixels, one or more of the multiple pixels by assigning each of the multiple pixels to one of multiple groups based on an angle of the edge direction of the pixel, and selecting, as the one or more pixels, a number of pixels from each of the multiple groups, the numbers of pixels selected from the multiple groups being within a threshold difference of one another;

a curve selection module configured to select one or more curves each having an angle within a threshold amount of a right angle in the input image; and a blur kernel generation module configured to generate, using the selected one or more pixels and the selected one or more curves, a blur kernel indicating how an image capture device was moved while capturing the input image.

18. A system as recited in claim 17, the edge selection module being further configured to obtain both gradient magnitudes and the edge directions for each of the multiple pixels.

19. A system as recited in claim 18, the edge selection module being further configured to:

apply an adaptive gradient magnitude threshold to the multiple groups so that different groups can have different gradient magnitude thresholds; and select, as the one or more of the multiple pixels, pixels from the multiple groups having gradient magnitudes that satisfy the gradient magnitude threshold for the group.

20. A system as recited in claim 17, the blur kernel generation module being further configure to generate the blur kernel by reducing an energy function based on second-order derivatives of the one or more curves and on first-order derivatives of the selected one or more pixels.

* * * * *